US012800313B2

(12) United States Patent
Barrau

(10) Patent No.: US 12,800,313 B2
(45) Date of Patent: Nov. 17, 2026

(54) METHOD FOR ASSISTING WITH THE NAVIGATION OF A VEHICLE

(71) Applicant: SAFRAN, Paris (FR)

(72) Inventor: Axel Barrau, Moissy-Cramayel (FR)

(73) Assignee: SAFRAN, Paris (FR)

( * ) Notice: Subject to any disclaimer, the term of this patent is extended or adjusted under 35 U.S.C. 154(b) by 204 days.

(21) Appl. No.: 18/281,446

(22) PCT Filed: Mar. 11, 2022

(86) PCT No.: PCT/FR2022/050442
§ 371 (c)(1),
(2) Date: Sep. 11, 2023

(87) PCT Pub. No.: WO2022/189760
PCT Pub. Date: Sep. 15, 2022

(65) Prior Publication Data

US 2024/0159539 A1 May 16, 2024

(30) Foreign Application Priority Data

Mar. 11, 2021 (FR) .................................. FR2102417

(51) Int. Cl.
*G01C 21/16* (2006.01)

(52) U.S. Cl.
CPC ......... *G01C 21/165* (2013.01); *G01C 21/183* (2020.08); *G01C 21/185* (2020.08); *G01C 21/1652* (2020.08)

(58) Field of Classification Search
CPC ................ G01C 21/165; G01C 21/185; G01C 21/1652; G01C 21/183
See application file for complete search history.

(56) References Cited

U.S. PATENT DOCUMENTS

2006/0074558 A1 4/2006 Williamson et al.
2018/0128645 A1* 5/2018 Wilkinson ........... G01C 25/005

OTHER PUBLICATIONS

Barrau et al., "The Invariant Extended Kalman filter as a stable observer," arXiv:1410.1465v4 [cs.SY], Oct. 19, 2015, pp. 1-36.

* cited by examiner

*Primary Examiner* — Kito R Robinson
*Assistant Examiner* — Zachary E. F. Glade
(74) *Attorney, Agent, or Firm* — Birch, Stewart, Kolasch & Birch, LLP

(57) ABSTRACT

Method, navigation device and computer program product for assisting with the navigation of a vehicle equipped with a navigation device, comprising the following steps: acquiring a priori values of kinematic variables of the navigation device, determining respective current values of the kinematic variables of the navigation device and a current uncertainty matrix representative of an uncertainty of the respective current values of the kinematic variables, based on respective previous values of the kinematic variables, a previous uncertainty matrix representative of an uncertainty of the respective previous values of the kinematic variables and a model of Earth's gravity experienced by the navigation device, the modeled gravity increasing with an altitude of the navigation device.

7 Claims, 2 Drawing Sheets

METHOD FOR ASSISTING WITH THE NAVIGATION OF A VEHICLE

FIELD OF THE INVENTION

This invention relates to the field of methods for navigating a vehicle. It more specifically relates to so-called hybrid navigation methods.

PRIOR ART

Hybrid navigation methods are methods in which measurements from several sensors (accelerometers, gyroscopes, GPS etc.) are fused to determine kinematic variables or information defining the state of a device implementing the method.

These kinematic variables are, for example, the position, the speed or the orientation of the device.

The measurements are, for example, inertial measurements, for example obtained from accelerometers and gyroscopes, such as the specific force, the angular rate or rotation speed of the device, speed measurements or position measurements of the device. The specific force is the sum of the external forces experienced by the device, other than gravitational, divided by the mass. This quantity thus has the dimension of an acceleration.

In particular, the use of the conventional extended Kalman filter to make a merge using altitude has limitations and requires a complex prior alignment procedure.

Conventional extended Kalman filtering works as long as the uncertainties on heading and position are small enough, which in particular involves an alignment procedure at the start of the navigation and more or less regular recourse to additional measurements (other than altitude) depending on the quality of the sensors used to obtain the different measurements.

In addition, a momentaneous loss of consistency, when the estimation error is greater than the uncertainty estimated by the Kalman filter, cannot always be corrected by the filter because of the non-linearity of the system. This loss of consistency is, for example, caused by an unforeseen increase in measurement noise.

The use of invariant filtering simplifies the alignment phase for hybridizations to which its theory applies, but also has limitations in the case of inertia-altimetry fusion. More precisely, the combination of invariant filtering with long phases of inertia-altimetry fusion intercut with rare position measurements does not provide any theoretical guarantees of convergence of the filtering. Generally the performance of invariant filtering is inferior to a conventional extended Kalman filter for inertia-altimetry fusion.

There is therefore a need for a new type of navigation method that makes it possible to use an altitude measurement in addition to the other available measurements.

SUMMARY OF THE INVENTION

The invention makes provision for remedying the aforementioned drawbacks.

In this regard, the invention makes provision, according to a first aspect, for a method for assisting with the navigation of a vehicle equipped with a navigation device comprising the following steps: acquiring a priori values of kinematic variables of the navigation device, determining respective current values of the kinematic variables of the navigation device and a current uncertainty matrix representative of an uncertainty on the respective current values of the kinematic variables, based on respective preceding values of the kinematic variables, on a preceding uncertainty matrix representative of an uncertainty on the respective preceding values of the kinematic variables and on a fictitious model of a terrestrial gravity experienced by the navigation device, the intensity of the modelled gravity increasing with the altitude of the navigation device, determining a correction based on respective current values of the kinematic variables and the measuring and updating of the respective current values of the kinematic variables based on the correction and on the current uncertainty matrix.

Thus this method makes it possible to determine the value of the kinematic variables of the navigation device. In particular it makes it possible to control at start-up the duration of the static initial phase also known as alignment.

In an embodiment, the kinematic variables comprise an orientation of the navigation device, a current value of which is a current orientation matrix and a preceding value of which is a preceding orientation matrix, a speed of the navigation device, a current value of which is a current speed vector and a preceding value of which is a preceding speed vector, and a position of the navigation device, a current value of which is a current position vector and a preceding value of which is a preceding position vector. The current uncertainty matrix is representative of an uncertainty on the current orientation matrix, on the current speed vector and on the current position vector, and the preceding uncertainty matrix is representative of an uncertainty on the preceding orientation matrix, on the preceding speed vector and on the preceding position vector.

In an embodiment, the current values are associated with a current time and the preceding values are associated with a preceding time. The determining of the current values of the kinematic variables comprises the determining of the current speed vector by adding to the preceding speed vector an integration, over a time interval between the preceding time and the current time, of a sum of a specific force of the navigation device and of the modeled gravity, the determining of the current position vector by adding to the preceding position vector an integration, over the time interval, of the preceding speed vector, the determining of the current orientation matrix by multiplying the preceding orientation matrix by a matrix representative of a rotation of the navigation device a determination of the current uncertainty matrix based on the preceding uncertainty matrix.

In an embodiment, the determining of the correction comprises a subtraction of the current speed vector and of the measurement, and a multiplication by a gain matrix.

In an embodiment, the determining of the correction comprises a subtraction of the current position vector and of the measurement, and a multiplication by a gain matrix.

In an embodiment, the correction is a correction vector, the updating comprises a sub-step of updating the current orientation matrix by multiplication of a rotation matrix of a first part of the correction vector and of the current orientation matrix, a sub-step of updating the current speed vector by adding to the speed vector a multiplication of the current rotation matrix and of a second part of the correction vector and a sub-step of updating the current position vector by adding to the current position vector a multiplication of the current rotation matrix and of a third part of the correction vector.

In an embodiment, the determining of kinematic variables of the navigation device comprises a step of determining the fictitious model of the gravity experienced using the formula $$g_n(X_n) = \frac{g_{réel}(r_T + h_n)}{r_T + h_n} X_n$$

where $g_n(X_n)$ is a modeled gravity vector, $g_{réel}$ is an opposite of a modulus of a terrestrial gravity coming from a physically consistent model, $r_T$ is a radius of the Earth, $X_n$ is the current position vector and $h_n$ is a measured altitude of the device.

In an embodiment, the determining of kinematic variables of the navigation device comprises a step of determining the fictitious model of the gravity experienced using the formula $$g_n(X_n) = g_{réel}(\pi_{h_n}(X_n)) \frac{r_T + alt(X_n)}{r_T + h_n}$$

where $g_n(X_n)$ is a modeled gravity vector, $g_{réel}$ is a terrestrial gravity vector coming from a physically consistent model, $r_T$ is a radius of the Earth, $X_n$ is the current position vector, $h_n$ is a measured altitude of the navigation device, $alt(X_n)$ is an altitude of the navigation device determined based on the current position vector and $\pi_{h_n}(X_n)$ is a modified position vector in which the altitude is the measured altitude.

Another aspect of the invention relates to a navigation device comprising a processing unit, three accelerometers and three gyroscopes. The navigation device also comprises a measuring device. The processing unit is configured for implementing the method for assisting with navigation previously described.

In an embodiment the navigation device further comprises a device for measuring an altitude of the navigation device.

Another aspect of the invention relates to a computer program product comprising program code instructions for executing the steps of the method for assisting with navigation previously described, when the latter is executed by a processor.

DESCRIPTION OF THE FIGURES

Other features and advantages of the invention will become further apparent from the following description, which is purely illustrative and non-limiting and must be read with reference to the appended figures in which.

DETAILED DESCRIPTION OF THE INVENTION

Figure 1:
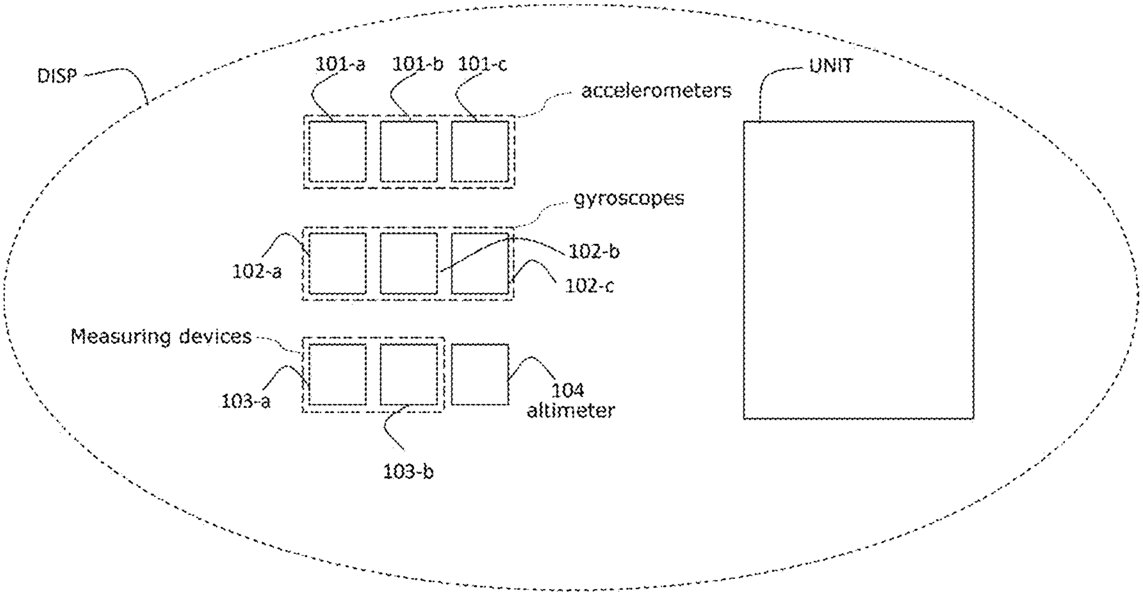
FIG. 1 shows a navigation system of the invention.

FIG. 1 schematically represents a navigation device. This navigation device DISP comprises a processing unit UNIT. This processing unit UNIT comprises a processor or a microcontroller for general or specific use and a memory.

The processor or microcontroller can be an Application-Specific Integrated Circuit (or ASIC). It can also be a Field-Programmable Gate Array (or FPGA).

The memory can be fixed or removable and include different memory units which can include a combination of units allowing for volatile and non-volatile storage. The memory is configured to store software code usable by the processor or the microcontroller to embody a method for determining respective values of kinematic variables of the navigation device DISP.

The values of the kinematic variables are used to locate the navigation device DISP and therefore the navigation of the bearer of this device.

The navigation device DISP also comprises three accelerometers 101-*a* to 101-*c*, three gyroscopes 102-*a* to 102-*c* and a device for measuring, for example, a physical quantity, for example depending on one or more kinematic variables or depending on a bias of one of the accelerometers or of one of the gyroscopes. This measuring device is for example a device 103-*a* for measuring a position of the navigation device DISP and/or a device 103-*b* for measuring a speed of the navigation device DISP.

The navigation device DISP can also include other devices for measuring a kinematic variable of the navigation device DISP.

In addition, the navigation device DISP can also include a device 104 for measuring an altitude of the navigation device DISP. This measuring device 104 is for example an altimeter 104.

The three accelerometers 101-*a* to 101-*c* are able to deliver specific force data. The three accelerometers are respectively associated with three axes which can be mutually orthogonal.

The three gyroscopes 102-*a* to 102-*c* are able to deliver angular position data. The three gyroscopes are respectively associated with three axes which can be mutually orthogonal.

More precisely, the accelerometers measure a specific force $f_n$ of the navigation device DISP and the gyroscopes measure an angular speed of the navigation device DISP. This angular speed is then transformed into a rotation matrix $\Omega_n$ representative of the rotation of the device. The time interval between two measurements is denoted dt.

Accelerometers and gyroscopes may either supply specific forces and angular speeds, or directly variations of speed and angle.

The device 103-*a* for measuring a position of the navigation device DISP:

a satellite navigation receiver, for example a receiver of GPS type for Global Positioning System or a receiver of Galileo type, a device performing a triangulation using vertices, the position of which is known or a Light Detection And Ranging (or LIDAR) device.

The device 103-*b* for measuring a speed of the navigation device DISP is for example:

a device using odometry, a device for measuring the speed of a boat, also known by the expression loch or a device for detecting the stopping of a vehicle, also known by the expression zupt (Zero velocity UPdaTe).

The data delivered by the three accelerometers 101-*a* to 101-*c*, by the three gyroscopes 102-*a* to 102-*c*, by the device 103-*a* for measuring a position or by the device 103-*b* for measuring a speed and where applicable by the altimeter 104 are received by the processing unit UNIT.

If the altimeter 104 is not present, a hypothesis can be made regarding the altitude of the navigation device DISP. If the bearer is a ship, the hypothesis that the altitude is zero can be made.

Figure 2:
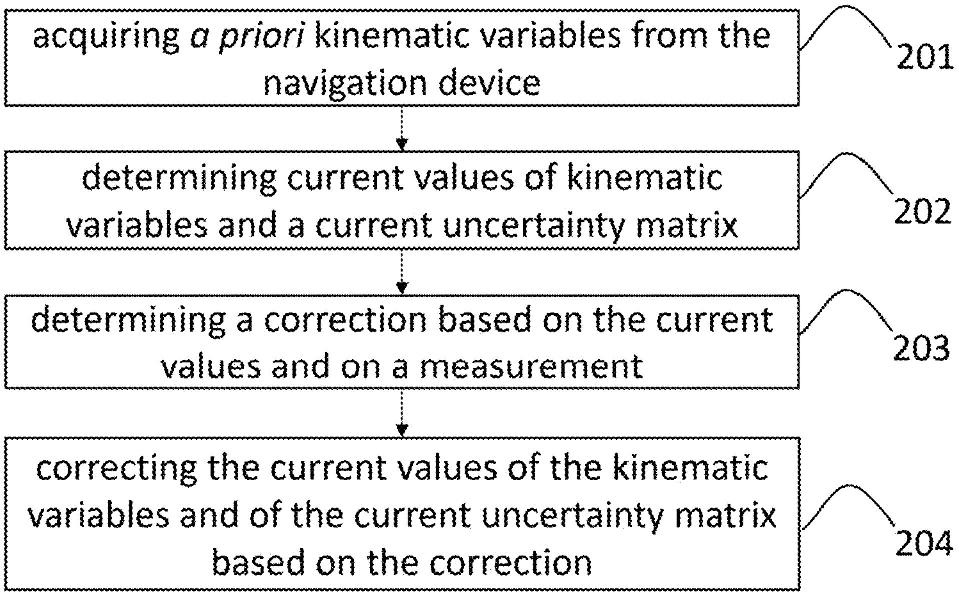
FIG. 2 shows a navigation method of the invention.

The processing unit UNIT is configured by the implementation of the method for determining respective values of kinematic variables of the navigation device DISP shown in FIG. 2. This method therefore allows the location of the navigation device DISP and therefore the navigation of the bearer of this device.

This method of FIG. 2 comprises:

- a step 201 of acquiring a priori kinematic variables from the navigation device,
- a step 202 of determining respective current values of kinematic variables of the navigation device DISP and a current uncertainty matrix representative of an uncertainty on the respective current values of the kinematic variables, based on respective preceding values of the kinematic variables of the device DISP and based on a fictitious model of the terrestrial attraction experienced by the device DISP in which the modeled attraction is of an intensity increasing with the altitude of the device DISP, and a preceding uncertainty matrix representative of an uncertainty on the respective preceding values of the kinematic variables,
- a step 203 of determining a correction based on the current values of the kinematic variables and based on a measurement and
- a step 204 of updating or correcting the current values of the kinematic variables and of the current uncertainty matrix based on the correction.

In this text, the fictitious model will be interchangeably known as "fictitious model of terrestrial attraction" and "fictitious model of terrestrial gravity". This model does indeed have a fictitious nature, due to the fact that the modeled attraction is of an intensity increasing with the altitude of the device DISP, which is contrary to a realistic model of gravity/terrestrial attraction in which such an intensity would decrease with such an altitude.

The measurement is for example the measurement of a physical quantity, for example depending on one or more kinematic variables or depending on a bias of one of the accelerometers or of one of the gyroscopes. This measurement is for example the position or the speed of the navigation device DISP.

In addition the modeled attraction coincides with the real attraction at the measured altitude of the bearer.

The kinematic variables of the device comprise:

- an orientation of the device, the value of which is a current or preceding orientation matrix T, of size 3 by 3, this orientation is represented by a quaternion,
- a speed of the device, the value of which is a present or preceding speed vector, of size 3, and
- a position of the device, the value of which is a present or preceding position vector X, of size 3.

Other variables can be estimated simultaneously, in particular biases in accelerometers and gyroscope measurements.

In addition, an uncertainty matrix P is used representative of an uncertainty on the kinematic variables. This matrix is a covariance matrix.

In the remainder of the document, the variables (matrix or vector) bearing a circumflex accent represent estimated variables; the corresponding actual variables are written without a circumflex accent.

The method comprises the determining of the value of these variables which are respectively denoted $\hat{T}_{n|n}$, $\hat{V}_{n|n}$ and $\hat{X}_{n|n}$. The method also comprises the determining of the covariance matrix $P_{n|n}$ representative of the uncertainty on the present estimate. It is also assumed that a covariance matrix $P_{0|0}$, representing the initial uncertainty, is available at the start of the navigation.

The index n here represents the time increment and, conventionally in a Kalman filter, the index n|n represents the estimate of the value at the time n taking into account the observation made at the time n and the index n|n−1 represents the estimate of the value at the time n without taking into account the observation made at the time n.

The method of the invention uses a Kalman filter (advantageously the invention uses an invariant Kalman filter), which involves a succession of propagation phases (including the determining 202) using inertial measurements and the fictitious terrestrial attraction model, and updating phases (comprising the determining 203 of a correction and the correction 204) using the position data delivered by the device 103-*a* for measuring a position or the speed data delivered by the device 103-*b* for measuring a speed. In other embodiments other types of measurements are used to determine the correction 203 and to make the update 204. In addition, during the determining 202 of a state of the device, the method uses an altitude measurement to feed a non-physical gravity model.

This altitude measurement can be supplied by the altimeter 104 if one is present, for example if the navigation system is present in an aircraft, the altitude of which may vary. This altitude measurement can also be known a priori in the case of a boat.

The determining 202 uses the following equations:

$$\hat{V}_{n|n-1} = \hat{V}_{n-1|n-1} + dt \cdot \left(\hat{T}_{n-1|n-1} f_n + g_n\left(\hat{X}_{n-1|n-1}\right)\right)$$

$$\hat{X}_{n|n-1} = \hat{X}_{n-1|n-1} + dt \cdot \hat{V}_{n-1|n-1}$$

$$\hat{T}_{n|n-1} = \hat{T}_{n-1|n-1} \Omega_n$$

$$P_{n|n-1} = F_n P_{n-1|n-1} F_n^T + Q_n$$

With:

- $\hat{V}_{n|n-1}$ is the current speed vector,
- $\hat{V}_{n-1|n-1}$ is the preceding speed vector,
- $\hat{X}_{n|n-1}$ is the current position vector,
- $\hat{X}_{n-1|n-1}$ is the preceding position vector,
- $\hat{T}_{n|n-1}$ is the current orientation matrix,
- $\hat{T}_{n-1|n-1}$ is the preceding orientation matrix,
- $g_n(\hat{X}_{n-1|n-1}) = \alpha_n \hat{X}_{n-1|n-1}$ is the fictitious model of the increasing intensity of the gravity experienced by the navigation device DISP $$-F_n = \begin{pmatrix} \Omega_n^T & 0_3 & 0_3 \\ -dt.\Omega_n^T (f_n)_\times & \Omega_n^T & dt.\alpha_n I_3 \\ 0_3 & dt.\Omega_n^T & \Omega_n^T \end{pmatrix}$$

$$-\alpha_n = \frac{g_{réel}(r_T + h_n)}{r_T + h_n}$$

- $g_{réel}$ is a physically consistent model of the opposite of a modulus of the gravity. The term "physically consistent" should be understood to mean a model in which the intensity of the gravity is only a function of the distance from a point to the center of the Earth and in which the intensity of the gravity decreases with altitude. Thus in this fictitious model, the approximation is made that the gravity oriented toward the center of the Earth and that its modulus is solely a function of the distance to the center of the Earth.
- $Q_n$ is a covariance matrix representing the uncertainty added by each step of propagation of the kinematic variables. The main source of this uncertainty is the inaccuracy of the measurements coming from the accelerometers and the gyroscopes. The exact values to be given to $Q_n$ are generally difficult to choose but can be chosen using specifications provided by the manufacturer of the navigation device DISP.

$r_T$ is the radius of the Earth (the distance to the center of the Earth corresponding to zero altitude).

$h_n$ is the altitude of the device DISP.

$(l)_x$ corresponds to an antisymmetric matrix formed with the components of the vector l, this matrix is such that for any vector u $$(l)_x u = l \times u$$

where x is a vector product.

P is a covariance matrix, in which the values of the diagonal represent the uncertainties of each variable of the state and in which the values that are not on the diagonal represent cross-uncertainty between the kinematic variables.

$P_{n-1|n-1}$ is the preceding uncertainty matrix, $P_{n|n-1}$ is the current uncertainty matrix.

Thus, in this determining step 202 a fictitious terrestrial attraction model $$g_n(X_n) = \alpha_n X_n$$

is used, with $$\alpha_n = \frac{g_{réel}(r_T + h_n)}{r_T + h_n}$$

This fictitious model is based on a realistic model but moves away from it. This fictitious model uses $g_{réel}$ which is an opposite of a spherical realistic model in which the intensity of the gravity is only a function of the distance from a point to the center of the Earth. The real gravity at a point $$X_n$$

is then written $$g_{réel}(\|X_n\|)\frac{X_n}{\|X_n\|}$$

where $\frac{X_n}{\|X_n\|}$ is a unit vector pointing in the direction of $X_n$.

In addition, a fictitious model $g_n(X_n)=\alpha_n X_n$ of the effect of gravity is used, the intensity of which is increasing with altitude but coincident with the realistic model only at the altitude $h_n$ (indicated by the altimeter).

Thus, if the position $X_n$ is located at an altitude h n this gives $$\|X_n\| = r_T + h_n$$

and therefore $$g_n(X_n) = g_{réel}(\|X_n\|)\frac{X_n}{\|X_n\|}:$$

the two gravity models coincide at the altitude $h_n$.

But the derivative of $g_n(X_n)$ with respect to $X_n$ is different from the derivative of the gravity in a conventional model since $g_n(X_n)$ has become linear. This is no longer the case if a realistic, more sophisticated model of gravity is chosen. However, the behavior of the filters is the same.

It is also possible to choose a more sophisticated fictitious model of terrestrial attraction, for example using the following formula:

$$g_n(X_n) = g'_{réel}(\pi_{h_n}(X_n))\frac{r_T + alt(X_n)}{r_T + h_n}$$

where the function $g'_{réel}$ is a vector of a terrestrial gravity resulting from a physically consistent model.

$r_t$ is the local radius of curvature of the Earth in $\pi_{h_n}(X_n)$.

$\pi_{h_n}(X_n)$ is the point for which the latitude and longitude are the latitude and longitude of $X_n$ respectively and the altitude of which is $h_n$.

$alt(X_n)$ is the altitude of $X_n$.

In an embodiment the step 203 of determining a correction ds comprises:

a subtraction of the current position vector and a measurement of the position of the navigation device (DISP), where applicable a transfer of this difference into the frame of reference of the bearer using the estimated orientation matrix and a multiplication by a gain matrix More accurately the step 203 of determining a correction ds may use the following equations:

$$z_n = \hat{T}_n^T(y_n - \hat{X}_{n|n-1})$$

$$K_n = P_{n|n-1}H_n^T(H_n P_{n|n-1} H_n^T + R_n)^{-1}$$

$$ds = K_n z_n$$

With:

ds the correction.

$Y_n$ the position supplied by the device for measuring a position 103-*a*.

$R_n$ a covariance matrix used to represent the measurement errors and the unmodeled quantities. It may depend or not on the estimated kinematic variables.

$$H_n = (0_3 0_3 I_3)$$

this matrix makes it possible to connect the measured position $Y_n$ to the other kinematic variables of the device DISP, $K_n$ is a gain matrix or matrix of transformation of the error on the position vector into a correction to be made to the other kinematic variables.

If the measuring device supplies a speed, the step 203 of determining a correction ds performs:

a subtraction of the current speed vector and a measurement of the speed of the navigation device (DISP), where applicable a transfer of this difference into the frame of reference of the bearer using the estimated orientation matrix and a multiplication by a gain matrix.

Thus, if the measuring device supplies a speed the computations of $z_n$ and $H_n$ are replaced by:

$$z_n = \hat{T}_n^T\left(Y_n - \hat{V}_{n|n-1}\right)$$

$$H_n = (0_3 \quad I_3 \quad 0_3)$$

ds is a vector of size 9. The first three components ($ds_{1:3}$) correspond to the rotation error. The next three components ($ds_{4:6}$) correspond to the speed error. The last three components ($ds_{7:9}$) correspond to the position error.

The matrix H comprises the concatenation of two null matrices of size 3 by 3 and an identity matrix of size 3 by 3.

K is known by the name of gain matrix.

This step 203 of determining a correction makes it possible to determine the deviation of all the kinematic variables of the navigation device based on the value of only one of the kinematic variables of the device.

This determining of the deviation is performed by the gain matrix K, which takes into account the uncertainties on the kinematic variables of the device DISP. If there is a low uncertainty, the position measurement $Y_n$ is given a low degree of consideration and, if there is a high uncertainty, the position measurement $Y_n$ is given a high degree of consideration. The term "the position measurement $Y_n$ is given a low degree of consideration" should be understood to mean that the value of the entries in the matrix K is low. The term "the position measurement $Y_n$ is given a high degree of consideration" should be understood to mean that the value of the entries in the matrix K is high.

The updating 204 uses the correction $$ds$$

to perform the following equations:

$$\hat{T}_{n|n} = \hat{T}_{n|n-1}R(ds_{1:3})$$

$$\hat{V}_{n|n} = \hat{V}_{n|n-1} + \hat{T}_{n|n-1}ds_{4:6}$$

$$\hat{X}_{n|n} = \hat{X}_{n|n-1} + \hat{T}_{n|n-1}ds_{7:9}$$

$$P_{n|n} = (I - K_nH_n)P_{n|n-1}$$

R is a function which makes it possible, based on a vector, to obtain a rotation matrix of the vector, $ds_{1:3}$ is the part of the correction vector relating to the correction of the orientation, $ds_{4:6}$ is the part of the correction vector relating to the correction of the speed, $ds_{7:9}$ is the part of the correction vector relating to the correction of the position $\hat{V}_{n|n}$ is the corrected speed vector, $\hat{X}_{n|n}$ is the corrected position vector, $\hat{T}_{n|n}$ is the corrected orientation matrix, $P_{n|n}$ is the corrected uncertainty matrix.

In another embodiment the updating 204 uses the correction ds to carry out the following equations:

$$\hat{T}_{n|n} = \hat{T}_{n|n-1}R(ds_{1:3})$$

$$\hat{V}_{n|n} = \hat{V}_{n|n-1} + \hat{T}_{n|n-1}V(ds_{1:3})ds_{4:6}$$

$$\hat{X}_{n|n} = \hat{X}_{n|n-1} + \hat{T}_{n|n-1}V(ds_{1:3})ds_{7:9}$$

$$P_{n|n} = (I - K_nH_n)P_{n|n-1}$$

With $$V_{(u)} = I_3 + \frac{(1-\cos(\|u\|))}{\|u\|^2}(u)_\times + \frac{(1-\sin(\|u\|))}{\|u\|^3}(u)_\times^2$$

in other words a matrix $V(ds_{1:3})$ is inserted.

The steps 202 to 204 of the method are repeated throughout the navigation.

In particular the corrected speed vector $\hat{V}_{n|n}$ becomes the next preceding speed vector, the corrected position vector $\hat{X}_{n|n}$ becomes the next preceding position vector and the corrected orientation matrix $\hat{T}_{n|n}$ becomes the next preceding orientation matrix.

This method uses the matrix P which is the covariance matrix and the set of operations applied to P over time are called the "Riccati equation". In the embodiment described above, the kinematic variables never appear in the matrix P (or only in the matrices $Q_n$ and $R_n$). Thus, this method shares an important property of linear systems. In more complex embodiments these kinematic variables may appear but the method of the invention makes it possible to reduce the negative effects of this dependence.

Figure 3:
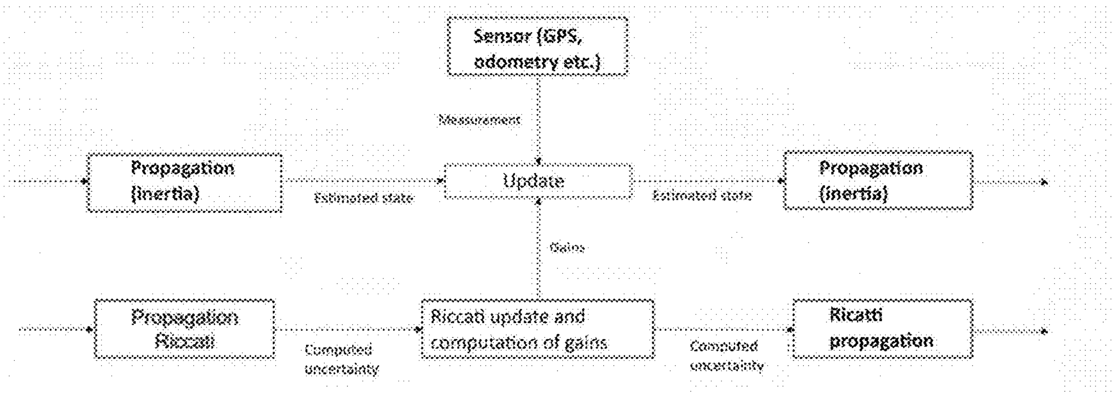
FIG. 3 shows a linear Kalman filter.

In the preceding embodiments, the fusion technique using the fictitious terrestrial attraction model is an invariant filter. In other embodiments other recalibration methods may be used, for example conventional extended Kalman filter sliding window smoothing constant gain filter particle filter FIG. 3 shows a linear Kalman filter. The estimated kinematic variables, which undergo a series of propagations (using the measurements of the accelerometers and gyroscopes) and updates (using an additional sensor such as a device for measuring a speed or a position), are shown on the middle line. The updates are corrections of the estimated state taking into account the new measurement coming from the additional sensor. The sensor does not directly give the correction to be made, but only gives a measurement. The difference between this measurement and the expected measurement is called the innovation. To transform this innovation into a correction of the system state, the gain matrix K is necessary. It is computed based on the Riccati equation appearing on the bottom line. This equation updates the covariance matrix P that represents an uncertainty on the kinematic variables. This covariance matrix P is used to construct the gain matrix K. If the estimate of the state is false, the measurements combined with the gain matrices are used to correct the estimate over time.

Figure 4:
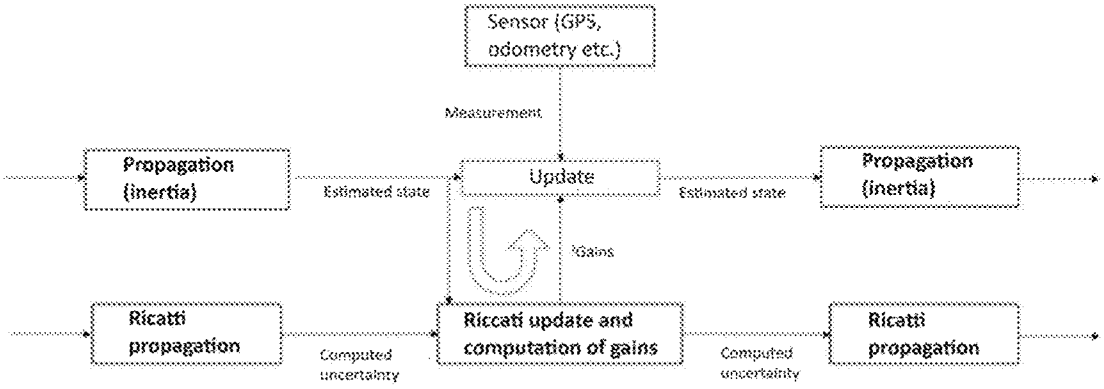
FIG. 4 shows an extended Kalman filter.

FIG. 4 shows a non-linear or extended Kalman filter. This Kalman filter makes it possible to manage the non-linear aspect of the state of the navigation device. The difference between FIG. 3 and FIG. 4 is the addition of the feedback of the middle line to the bottom line. Thus in this filter the estimated state is used to compute the uncertainty and the gains. This feedback may cause a reduction in the performance of the filter. An error on the system state incurs an error on the gains, which in turn incurs an error on the estimated state.

In one of the implementations of the invention, the set of operations involving the matrix P do not cause the estimated error of the navigation device DISP to appear (or cause it to appear only in the matrices $Q_n$ and $R_n$). Thus one is in the same case as for a linear system and the feedback of FIG. 4 has disappeared.

The invention claimed is:

1. A method of assisting navigation of a vehicle equipped with a navigation device, the navigation device comprising an altimeter configured to measure an altitude of the navigation device, the navigation device comprising an altimeter configured to measure an altitude of the navigation device, three accelerometers configured to measure a specific force, three gyroscopes configured to measure an angular speed of the navigation device, and a measuring device configured to obtain a position measurement, the method being implemented by a processing unit of the navigation device and comprising:

acquiring apriori values of kinematic variables of the navigation device, the kinematic variable comprising;

an orientation of the navigation device, a current value of which is a current orientation matrix and a preceding value of which is a preceding orientation matrix, a speed of the navigation device, a current value of which is a current speed vector and a preceding value of which is a preceding speed vector and a position of the navigation device, a current value of which is a current position vector and a preceding value of which is a preceding position vector, the position depending on the altitude, determining updated values of the kinematic variables, by using a Kalman filter, comprising determining a vector modelling a gravity experienced by the navigation device, an intensity of the modelled gravity defined by a modulus of said vector increasing with the altitude of the navigation device, the vector being determined from the preceding position vector $\hat{X}_{n-1|n-1}$ using the formula $g_N(\hat{X}_{n-1|n-1})=\alpha_n\hat{X}_{n-1|n-1}$, with $$a_n = \frac{g_{r\acute{e}el}(r_T + h_n)}{r_T + h_n},$$

wherein $g_{r\acute{e}el}$ is an opposite of a modulus of a terrestrial gravity coming from a physically consistent model, $r_T$ is a radius of the Earth, and $h_n$ is the altitude of the navigation device measured by the altimeter;

determining current values of the kinematic variables of the navigation device, from:

respective preceding values of the kinematic variables, the vector modeling the terrestrial gravity experienced by the navigation device, determining a current uncertainty matrix representative of an uncertainty on the current orientation matrix, on the current speed vector and on the current position vector, from:

a preceding uncertainty matrix representative of an uncertainty on the orientation matrix, on the preceding speed vector and on the preceding position vector;

a transition matrix $F_n$ defined by $$F_n = \begin{pmatrix} \Omega_n^T & 0_3 & 0_3 \\ -dt\cdot\Omega_n^T(f_n)_\times & \Omega_n^T & dt\cdot\alpha_n I_3 \\ 0_3 & dt\cdot\Omega_n^T & \Omega_n^T \end{pmatrix},$$

wherein $f_n$ is the specific force measured by the three accelerometers, and $$\Omega_n^T$$

is a transposed of a matrix representative of a rotation of the navigation device, obtained by transformation of the angular speed measured by the three gyroscopes;

determining a correction from:

the respective current values of the kinematic variables and the current uncertainty matrix, and the position measurement obtained by the measuring device; and updating the respective current values of the kinematic variables and of the current uncertainty matrix from the correction and from the current uncertainty matrix, so as to obtain the updated values; and navigating the vehicle based on the updated values.

2. The method as claimed in claim 1, the current values being associated with a current time and the preceding values being associated with a preceding time, and wherein determining the current values of the kinematic variables and of the current uncertainty matrix comprises:

determining the current speed vector by adding to the preceding speed vector an integration, over a time interval between the preceding time and the current time, of a sum of a specific force of the navigation device and of the vector modelling the terrestrial gravity experienced by the navigation device, determining of current position vector by adding to the preceding position vector an integration, over the time interval, of the preceding speed vector, determining of current orientation matrix by multiplying the preceding orientation matrix by a matrix representative of a rotation of the navigation device.

3. The method as claimed in claim 1, wherein determining the correction comprises:

a subtraction of the current speed vector and of the measurement, and a multiplication by a gain matrix.

4. The method as claimed in claim 1, wherein determining of the correction comprises:

a subtraction of the current position vector and of the measurement, and a multiplication by a gain matrix.

5. The method as claimed in claim 1, wherein correction is a correction vector, and wherein updating the respective current values of the kinematic variables and of the current uncertainty matrix comprises:

updating the current orientation matrix by multiplication of a rotation matrix of a first part of the correction vector and of the current orientation matrix, updating the current speed vector by adding to the speed vector a multiplication of the current rotation matrix and of a second part of the correction vector and updating the current position vector by adding to the current position vector a multiplication of the current rotation matrix and of a third part of the correction vector.

6. A navigation device comprising:

three accelerometers configured to measure a specific force;

three gyroscopes configured to measure an angular speed of the navigation device;

an altimeter configured to measure an altitude of the navigation device;

a measuring device configured to obtain a position measurement; and a processing unit configured to carry out the following steps:

acquiring a priori values of kinematic variables of the navigation device, the kinematic variable comprising an orientation of the navigation device, a current value of which is a current orientation matrix and a preceding value of which is a preceding orientation matrix, a speed of the navigation device, a current value of which is a current speed vector and a preceding value of which is a preceding speed vector and a position of the navigation device, a current value of which is a current position vector and a preceding value of which is a preceding position vector, the position depending on the altitude, determining updated values of the kinematic variables, by using a Kalman filter, comprising determining a vector modelling a gravity experienced by the navigation device, an intensity of the modelled gravity defined by a modulus of said vector increasing with the altitude of the navigation device, the vector being determined from the preceding position vector $\hat{X}_{n-1|n-1}$ using the formula $g_n(\hat{X}_{n-1|n-1})=\alpha_n\hat{X}_{n-1|n-1}$, with $$a_n = \frac{g_{r\acute{e}el}(r_T + h_n)}{r_T + h_n},$$

wherein $g_{r\ddot{e}el}$ is an opposite of a modulus of a terrestrial gravity coming from a physically consistent model, $r_T$ is a radius of the Earth, and $h_n$ is the altitude of the navigation device measured by the altimeter;

determining current values of the kinematic variables of the navigation device, from:

respective preceding values of the kinematic variables, the vector modelling the terrestrial gravity experienced by the navigation device;

determining a current uncertainty matrix representative of an uncertainty on the current orientation matrix, on the current speed vector and on the current position vector, from:

a preceding uncertainty matrix representative of an uncertainty on the preceding orientation matrix, on the preceding speed vector and on the preceding position vector, and a transition matrix $F_n$ defined by $$F_n = \begin{pmatrix} \Omega_n^T & 0_3 & 0_3 \\ -dt\cdot\Omega_n^T(f_n)_\times & \Omega_n^T & dt\cdot\alpha_n I_3 \\ 0_3 & dt\cdot\Omega_n^T & \Omega_n^T \end{pmatrix},$$

wherein $f_n$ is the specific force of the navigation device measured by the three accelerometers, and $$\Omega_n^T$$

is a transposed of a matrix representative of a rotation of the navigation device, obtained by transformation of the angular speed measured by the three gyroscopes;

determining a correction from:

the respective current values of the kinematic variables and the current uncertainty matrix, and a position measurement measured by the position device; and updating the respective current values of the kinematic variables and of the current uncertainty matrix from the correction and from the current uncertainty matrix, so as to obtain the updated values' and navigating the vehicle based on the updated values.

7. A non-transitory computer-readable medium comprising code instructions for causing a processing unit of a navigation device to perform the following steps:

acquiring apriori values of kinematic variables of the navigation device, the kinematic variable comprising an orientation of the navigation device, a current value of which is a current orientation matrix and a preceding value of which is a preceding orientation matrix, a speed of the navigation device, a current value of which is a current speed vector and a preceding value of which is a preceding speed vector and a position of the navigation device, a current value of which is a current position vector and a preceding value of which is a preceding position vector, the position depending on an altitude of the navigation device measured by an altimeter, and being measured by a measuring device;

determining updated values of the kinematic variables, by using a Kalman filter, comprising determining a vector modelling a gravity experienced by the navigation device, an intensity of the modelled gravity defined by a modulus of said vector increasing with the altitude of the navigation device, the vector being determined from the preceding position vector $\hat{X}_{n-1|n-1}$ using the formula $g_n+(\hat{X}_{n-1|n-1})=\alpha_n\hat{X}_{n-1|n-1}$, with $$a_n = \frac{g_{r\acute{e}el}(r_T + h_n)}{r_T + h_n},$$

wherein $g_{r\acute{e}el}$ is an opposite of a modulus of a terrestrial gravity coining from a physically consistent model, $r_T$ is a radius of the Earth, and $h_n$ is the altitude of the navigation device measured by the altimeter;

determining current values of the kinematic variables of the navigation device, from:

respective preceding values of the kinematic variables, the vector modelling the terrestrial gravity experienced by the navigation device;

determining a current uncertainty matrix representative of an uncertainty on the current orientation matrix, on the current speed vector and on the current position vector, from:

a preceding uncertainty matrix representative of an uncertainty on the preceding orientation matrix, on the preceding speed vector and on the preceding position vector, and a transition matrix $F_n$ defined by $$F_n = \begin{pmatrix} \Omega_n^T & 0_3 & 0_3 \\ -dt \cdot \Omega_n^T (f_n)_\times & \Omega_n^T & dt \cdot \alpha_n I_3 \\ 0_3 & dt \cdot \Omega_n^T & \Omega_n^T \end{pmatrix},$$

wherein $f_n$ is a specific force of the navigation device measured by three accelerometers, and $$\Omega_n^T$$

is a transposed of a matrix representative of a rotation of the navigation device, obtained by transformation of an angular speed of the navigation device measured by three gyroscopes;

determining a correction from:

the respective current values of the kinematic variables and the current uncertainty matrix, and a position measurement measured by the measuring device;

updating the respective current values of the kinematic variables and of the current uncertainty matrix from the correction and from the current uncertainty matrix, so as to obtain the updated values; and navigating the vehicle based on the updated values.

* * * * *